US012681834B2

(12) United States Patent
Jain et al.

(10) Patent No.: US 12,681,834 B2
(45) Date of Patent: Jul. 14, 2026

(54) DETERMINING RISK BASED TEST CASES IN BUILD ROUTINES

(71) Applicant: INTERNATIONAL BUSINESS MACHINES CORPORATION, Armonk, NY (US)

(72) Inventors: Rahul Jain, Kolkata (IN); Manjit Singh Sodhi, Bangalore (IN); Shashank Mujumdar, Nagpur (IN); Kalapriya Kannan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 193 days.

(21) Appl. No.: 18/526,420

(22) Filed: Dec. 1, 2023

(65) Prior Publication Data

US 2025/0181479 A1    Jun. 5, 2025

(51) Int. Cl.
*G06F 9/44*          (2018.01)
*G06F 11/3604*     (2025.01)

(52) U.S. Cl.
CPC ................................. *G06F 11/3608* (2013.01)

(58) Field of Classification Search
None
See application file for complete search history.

(56) References Cited

U.S. PATENT DOCUMENTS

| | | |
|---|---|---|
| 6,061,643 A | 5/2000 | Walker et al. |
| 8,230,401 B2 | 7/2012 | Branca et al. |
| 8,694,966 B2 | 4/2014 | Gupta |
| 9,043,582 B2 | 5/2015 | Larin |
| 9,411,710 B2 | 8/2016 | Kumar et al. |
| 9,720,815 B2 | 8/2017 | Champlin-Scharf et al. |
| 2015/0026664 A1 | 1/2015 | Bartley et al. |
| 2019/0324886 A1 | 10/2019 | Champlin-Scharff et al. |
| 2021/0303442 A1 | 9/2021 | Chenguttuvan et al. |

(Continued)

FOREIGN PATENT DOCUMENTS

| | | |
|---|---|---|
| CN | 102176200 | 9/2011 |
| EP | 1622022 | 2/2006 |

OTHER PUBLICATIONS

Asisi, "A Tag-based Recommender System for Regression Test Case Prioritization," Apr. 2021 (Year: 2021).*

(Continued)

*Primary Examiner* — Insun Kang
(74) *Attorney, Agent, or Firm* — Seed Intellectual Property Law Group LLP

(57) ABSTRACT

A processor set is configured to receive a plurality of software modules to be analyzed and select one or more software modules that contain modified code. The processor set may further parse product documentation or code comments related to the selected software modules and use the parsed product documentation or code comments to generate a dependency matrix (DM). The processor set may also tag test cases with an associated directed acyclic graph (DAG) that includes a sequence of modules directly or indirectly impacted by the test cases. By reconciling the DM and the DAG for the test cases, the processor set may generate a consolidated directed acyclic graph (CDAG). The processor set may determine, and perform, an optimized list of test cases, based on the generated CDAG and one or more consolidated dependency matrix (CDM) nodes.

18 Claims, 5 Drawing Sheets

(56) References Cited

U.S. PATENT DOCUMENTS

2023/0401144 A1 * 12/2023 Nidugala ............ G06F 11/3684
2024/0020112 A1 * 1/2024 Lin .................... G06F 11/3688

OTHER PUBLICATIONS

CN 114398291, English text (Year: 2022).*

Shimari et al., "Selecting Test Cases based on Similarity of Runtime Information: A Case Study of an Industrial Simulator", International Conference on Software Maintenance and Evolution (ICSME), Dec. 19, 2022; 4 Pages.

Machalica et al., "Predictive Test Selection: A More Efficient Way to Ensure Reliability of Code Changes", https://engineering.fb.com/2018/11/21/developer-tools/predictive-test-selection/, Nov. 21, 2018; 11 Pages.

Indumathi et al., "Test Cases Prioritization Using Open Dependency Structure Algorithm", https://www.researchgate.net/publication/277935946_Test_Cases_Prioritization_Using_Open_Dependency_Structure_Algorithm, Dec. 2015; 6 Pages.

Yoo et al., "Regression Testing Minimization, Selection and Prioritization: A Survey", https://coinse.github.io/publications/pdfs/Yoo2010fk.pdf, Mar. 11, 2010; 54 Pages.

Dwarakanath et al., "Minimum Number of Test Paths for Prime Path and Other Structural Coverage Criteria", https://www.researchgate.net/publication/279200921_Minimum_Number_of_Test_Paths_for_Prime_Path_and_Other_Structural_Coverage_Criteria, Sep. 2014; 17 Pages.

* cited by examiner

Figure 1:
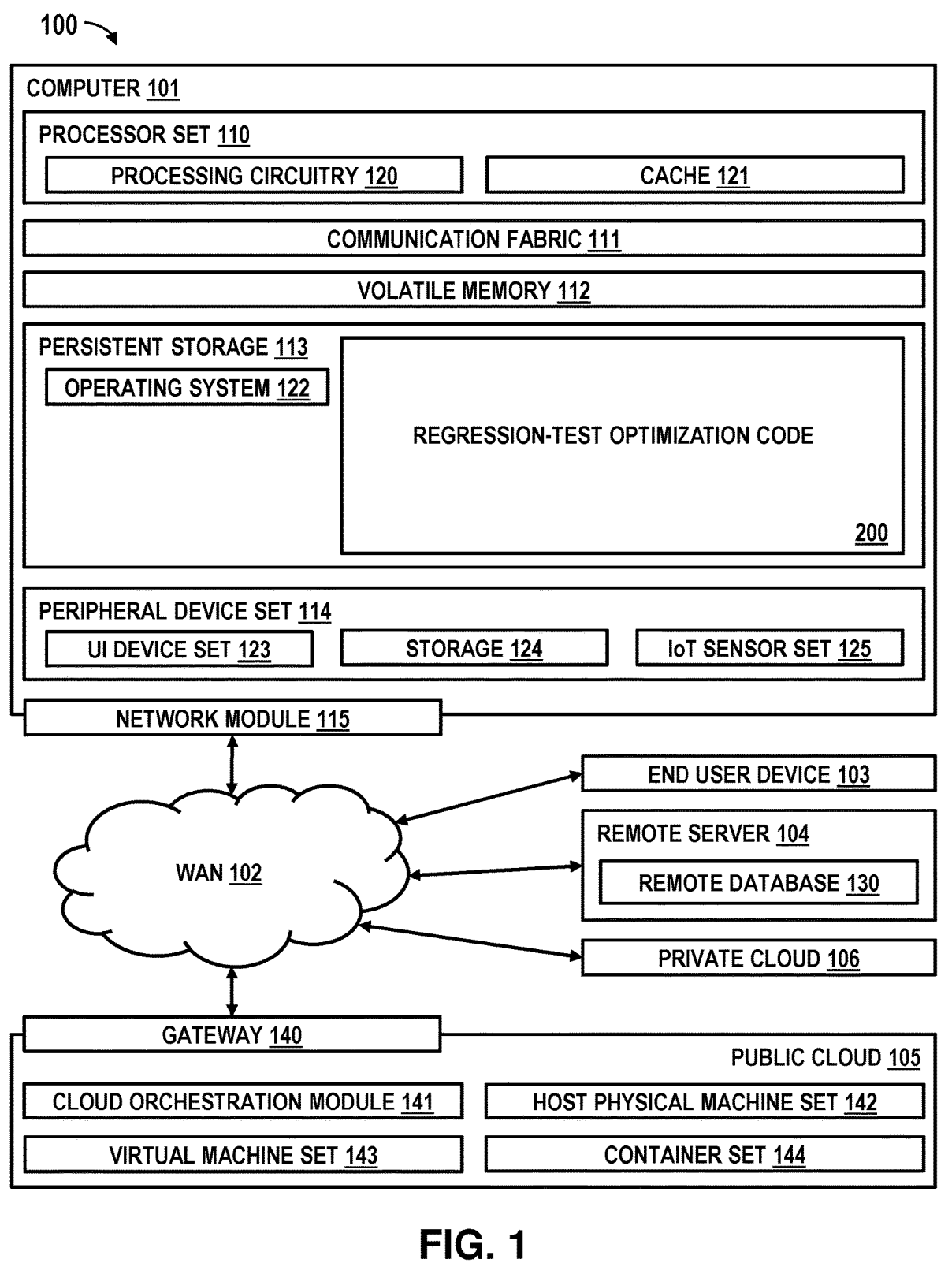

100

COMPUTER 101

PROCESSOR SET 110

PROCESSING CIRCUITRY 120    CACHE 121

COMMUNICATION FABRIC 111

VOLATILE MEMORY 112

PERSISTENT STORAGE 113

OPERATING SYSTEM 122

REGRESSION-TEST OPTIMIZATION CODE

200

PERIPHERAL DEVICE SET 114

UI DEVICE SET 123    STORAGE 124    IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141    HOST PHYSICAL MACHINE SET 142

VIRTUAL MACHINE SET 143    CONTAINER SET 144

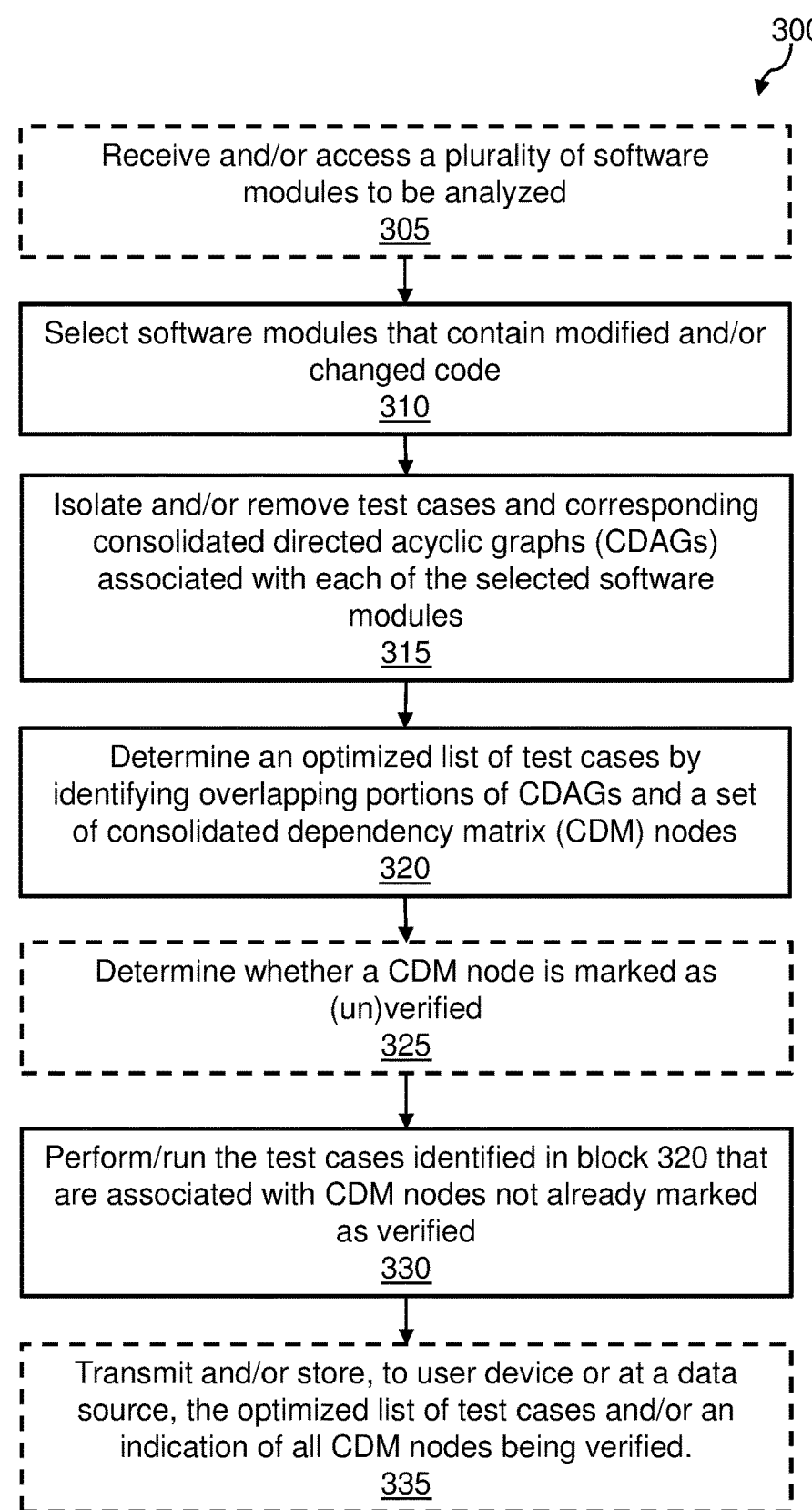

300

Receive and/or access a plurality of software
modules to be analyzed
305

Select software modules that contain modified and/or
changed code
310

Isolate and/or remove test cases and corresponding
consolidated directed acyclic graphs (CDAGs)
associated with each of the selected software
modules
315

Determine an optimized list of test cases by
identifying overlapping portions of CDAGs and a set
of consolidated dependency matrix (CDM) nodes
320

Determine whether a CDM node is marked as
(un)verified
325

Perform/run the test cases identified in block 320 that
are associated with CDM nodes not already marked
as verified
330

Transmit and/or store, to user device or at a data
source, the optimized list of test cases and/or an
indication of all CDM nodes being verified.
335

FIG. 3

DETERMINING RISK BASED TEST CASES IN BUILD ROUTINES

BACKGROUND

Aspects of the present invention relate generally to computer systems and, more particularly, to regression test optimization by a computer system.

Regression testing is a type of testing in a software development cycle that generally runs after every change, or after a set of changes, to ensure that the changes do not create unintended breaks or errors. Regression testing generally tests for the presence and/or emergence of bugs (old and/or new) with the introduction of new changes.

Typically, regression testing involves writing a test for a known bug and re-running this test after every change to the code base. This aims to immediately identify any change that reintroduces a bug. Regression testing ensures that with frequent changes, developers do not break things that already work.

SUMMARY

In a first aspect of the invention, there is a computer-implemented method including: receiving, by a processor set, a plurality of software modules to be analyzed; selecting, by the processor set, one or more software modules of the plurality of software modules that contain modified code; parsing, by the processor set, product documentation or code comments related to the selected one or more software modules; generating, by the processor set, a dependency matrix (DM) based on the parsed product documentation or code comments; tagging, by the processor set, one or more test cases with an associated directed acyclic graph (DAG) comprising a sequence of modules directly or indirectly impacted by the one or more test cases; generating, by the processor set, a consolidated directed acyclic graph (CDAG) by reconciling the DM and the DAG for each of the one or more test cases; determining, by the processor set, an optimized list of test cases based on the generated CDAG and one or more consolidated dependency matrix (CDM) nodes; and performing, by the processor set, each test case of the optimized list of test cases.

In another aspect of the invention, there is a computer program product including one or more computer readable storage media having program instructions collectively stored on the one or more computer readable storage media. The program instructions are executable to receive a plurality of software modules to be analyzed; select one or more software modules of the plurality of software modules that contain modified code; parse product documentation or code comments related to the selected one or more software modules; generate a dependency matrix (DM) based on the parsed product documentation or code comments; tag one or more test cases with an associated directed acyclic graph (DAG) comprising a sequence of modules directly or indirectly impacted by the one or more test cases; generate a consolidated directed acyclic graph (CDAG) by reconciling the DM and the DAG for each of the one or more test cases; determine an optimized list of test cases based on the generated CDAG and one or more consolidated dependency matrix (CDM) nodes; and perform each test case of the optimized list of test cases.

In another aspect of the invention, there is a system including a processor set, one or more computer readable storage media, and program instructions collectively stored on the one or more computer readable storage media. The program instructions are executable to receive a plurality of software modules to be analyzed; select one or more software modules of the plurality of software modules that contain modified code; parse product documentation or code comments related to the selected one or more software modules; generate a dependency matrix (DM) based on the parsed product documentation or code comments; tag one or more test cases with an associated directed acyclic graph (DAG) comprising a sequence of modules directly or indirectly impacted by the one or more test cases; generate a consolidated directed acyclic graph (CDAG) by reconciling the DM and the DAG for each of the one or more test cases; determine an optimized list of test cases based on the generated CDAG and one or more consolidated dependency matrix (CDM) nodes; and perform each test case of the optimized list of test cases.

BRIEF DESCRIPTION OF THE DRAWINGS

Aspects of the present invention are described in the detailed description which follows, in reference to the noted plurality of drawings by way of non-limiting examples of exemplary embodiments of the present invention.

FIG. 1 depicts a computing environment according to an embodiment of the present invention.

FIG. 3 shows a flowchart of an exemplary method in accordance with aspects of the present invention.

DETAILED DESCRIPTION

Figure 2:
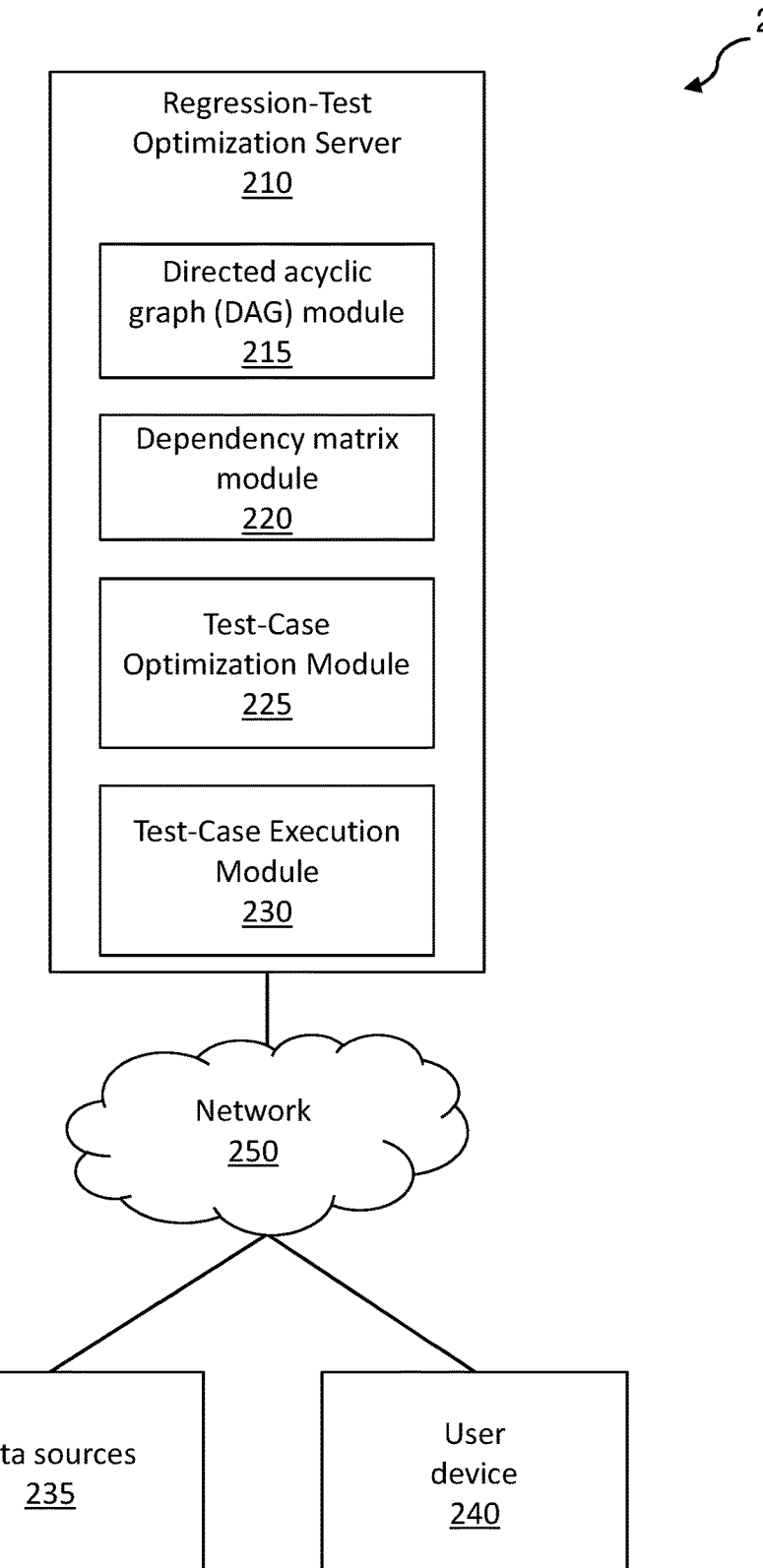
FIG. 2 shows a block diagram of an exemplary environment in accordance with aspects of the present invention.

Aspects of the present invention relate generally to computer systems and more specifically to identifying one or more regression tests to ensure coverage for regressions in a continuous integration environment. According to aspects of the invention, a processor parses product documentation and/or code comments of a software module and creates a dependency matrix (DM) therefrom. The processor further creates a directed acyclic graph (DAG) comprising sequences of nodes directly or indirectly impacted by a regression. In embodiments, the processor determines an optimized set of test cases based on a consolidated directed acyclic graph (CDAG) created by reconciling the DM and the DAG, thereby ensuring full coverage regression testing for code changes in a continuous integration environment without manual interference.

As used herein, a DM is a graph that tracks/shows dependencies between parts of a software build (e.g., modules, classes, files, etc.) and highlights an information flow. The DM shows how/which modules might be affected when the code is modified. Further, as used herein, a test case is a set of specifications that may include inputs, execution conditions, testing procedure(s), and an expected result(s) that defines a test such that, when executed, it achieves a particular objective. For example, this may include exercising, or exploiting, a particular program path or verifying a particular path's compliance with a specific requirement.

A DAG, as used herein, shows a trace/profile/critical path taken by the test cases as the software module is tested. The created DAG represents a structure of software modules or blocks and may be helpful to visualize the flow of values between basic software modules or blocks. A CDAG, as used herein, is more robust than a DAG because the CDAG is produced after reconciling and/or consolidating a DAG with an associated DM.

Embodiments relate to a method for intelligently picking an optimal set of test cases to ensure that the set of test cases covers all the required checks. The method may further optimize execution time by exhaustively identifying test case dependencies through code and product documentation. The method further includes constructing a DAG associated with each test case. By creating a DM by identifying test case dependencies through code and product documentation, creating a DAG by identifying a sequence of software modules that are directly or indirectly impacted by the selected test case, and then creating a CDAG by reconciling the generated DAG and DM, the systems, methods, and computer-program products described herein provide an improvement to the field of regression testing. That is, the systems, methods, and computer-program products described herein find a minimum number of test cases to run to ensure full coverage and full verification for all of the software modules affected by code change. Furthermore, these features also enable a computer to operate more efficiently by intelligently reducing the amount of processing needed to provide full coverage regression tests.

Embodiments provide a method for parsing product requirement documentation and code comments, to determine an exhaustive DM of software modules. The method may also, or alternatively, include providing each test case as input for a DAG creation module, which identifies module dependencies from a created DAG. The method may further comprise tagging each test case with its DAG wherein each node in the graph is the module directly or indirectly impacted by the test case. According to at least one embodiment, the method may comprise reconciling the DM and DAG for each test case to come up with a CDAG, which may have a more comprehensive DAG attached to each test case.

Implementations of the invention are necessarily rooted in computer technology. For example, the steps of receiving a plurality of modules to be analyzed, selecting software modules that contain modified code, parsing product documentation and code comments related to the selected software modules, generating a dependency matrix (DM), tagging test cases with an associated an associated directed acyclic graph (DAG) comprising a sequence of modules directly or indirectly impacted by the one or more test cases, generating a consolidated directed acyclic graph (CDAG) by reconciling the DM and the DAG the test cases, determining an optimized list of test cases based on the generated CDAG and one or more consolidated dependency matrix (CDM) nodes, and running each of the test cases on the optimized list of test cases are computer-based and due to the vast amounts of data and the complexity of data dependencies and relationships cannot be performed in the human mind. That is, the methods, systems, and computer program products described herein are performed by a computer and cannot practically be performed in the human mind (or with pen and paper) due to the complexity and massive amounts of calculations involved. Given this scale and complexity, it is simply not possible for the human mind, or for a person using pen and paper, to perform the number of calculations involved in carrying out the methods described herein.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as regression-test optimization code of block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open-source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future.

In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

FIG. 2 shows a block diagram of exemplary environment 205 in accordance with aspects of the invention. In embodiments, environment 205 includes regression-test optimization server 210, data sources 235, user device 240, and network 250.

The regression-test optimization server 210 may comprise one or more instances of computer 101 of FIG. 1. In another example, regression-test optimization server 210 may comprise one or more virtual machines or containers running on one or more instances of computer 101 of FIG. 1. In embodiments, regression-test optimization server 210 communicates with data sources 235 and user device 240 via network 250, which may comprise WAN 102 of FIG. 1. In embodiments, data sources 235 comprise one or more data sources each comprising an instance of remote database 130 of FIG. 1. In embodiments, user device 240 comprises an instance of end user device 103 of FIG. 1. There may be plural different instances of user device 240 used by different users and evaluators, respectively.

In embodiments, regression-test optimization server 210 of FIG. 2 comprises DAG module 215, dependency matrix module 220, test-case optimization module 225, and test-case execution module 230, each of which may be, or may comprise, modules of regression-test optimization code of block 200 of FIG. 1. Such modules may include routines, programs, objects, components, logic, data structures, and so on that perform a particular task (or tasks) or implement a particular data type (or types) that the regression-test optimization code of block 200 uses to carry out the functions and/or methodologies of embodiments of the invention as described herein. These modules of regression-test optimization code of block 200 are executable by processing circuitry 120 of FIG. 1 to perform the inventive methods as described herein. The regression-test optimization server 210 may include additional or fewer modules than those shown in FIG. 2. In embodiments, separate modules may be integrated into a single module. Additionally, or alternatively, a single module may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

In accordance with aspects of the invention, DAG module 215 is configured to retrieve test-case documentation, select a test case, identify one or more sequences of modules directly or indirectly impacted by the selected test case, and generate a DAG comprising at least the identified sequences.

For example, DAG module 215 may be configured to retrieve test-case documentation for one or more test cases. In embodiments, the test-case documentation may include a summary of the scope of each retrieved test, test objectives, the system functionalities based on the test scenarios and requirements, hardware and software configurations required to run the test.

In embodiments, DAG module 215 selects one of the test cases of the one or more test cases based on the test-case documentation, the objectives of the test, and the system functionalities. According to aspects of the invention, DAG module 215 may also be configured to identify one or more sequences of modules that are directly and/or indirectly impacted by the selected test. In embodiments, identifying one or more sequences may include determining dependencies of the various modules tested by the test case.

In embodiments, DAG module 215 may be configured to generate a DAG comprising at least the one or more sequences of the identified modules. As used herein, a DAG shows a trace/profile/critical path taken by the test cases as the software module is tested. The DAG created by DAG module 215 represents a structure of software modules and/or blocks and shows the flow of values between basic software modules and/or blocks. In an embodiment, the generated DAG may be attached to an associated test case. In other words, the test case carries with it the associated or accompanying DAG, showing the one or more identified sequences that the test case uses to verify the sequences.

In embodiments, DAG module 215 is further configured to determine whether additional tests should be evaluated. In other words, DAG module 215 may determine whether DM node has been verified (i.e., tested). If there are more tests to run (e.g., when there are still unverified DM nodes), DAG module 215 selects an additional case and repeats the processes described herein, until each test case has been evaluated and/or each DM node has been verified.

In accordance with aspects of the invention, dependency matrix module 220 is configured to retrieve code comments and production documentation associated with or accompanying one or more software modules, identify module dependencies by parsing the code comments and/or the product documentation, and create a DM based on the identified module dependencies within the code comments and/or the product documentation.

In embodiments, dependency matrix module 220 is configured to retrieve code comments and production documentation associated with one or more software modules. That is, when software code is written and/or created, developers often include human-readable comments describing the goals, strategy, logic, actions, and other details about functionality of the code. Proper use of commenting can make code maintenance easier and helps others understand the functions the code should perform. The code comments may further include descriptions about module dependencies. Additionally, the product documentation may include descriptions about module dependencies. Product documentation, as used herein, includes external documentation such as user manuals, technical specifications, design documents, and internal documents like coding guidelines, standards, and conventions. Product documentation generally provides information about a codebase to developers working on the project, helping them understand and improve it. The product documentation also guides users and other technical professionals who may need to work with the code in the future.

In embodiments, dependency matrix module 220 is configured to identify potential module dependencies by parsing the retrieved code comments and/or product documentation. In embodiments, the parsing is performed to determine an exhaustive DM. As explained above, a DM is a graph that tracks/shows dependencies between parts of a software build (e.g., modules, classes, files, etc.) and highlights an information flow. The DM shows how/which modules might be affected when the code is modified or when the code associated with a related module, is modified.

In accordance with aspects of the invention, test-case optimization module 225 is configured to select software modules that have been through code change, isolate and/or remove test cases and corresponding CDAGs associated with each of the selected software modules, and determine an optimized list of test cases by identifying overlapping portions of CDAGs and a set of consolidated dependency matrix (CDM) nodes.

In embodiments, test-case optimization module 225 is configured to select at least one software module that has been through a code change. That is, test-case optimization module 225 selects code that has been modified, updated, or experienced any change that might be tested to ensure that no bugs or unintended breaks in the code have been introduced. For example, as explained above, a processing system (such as regression-test optimization server 210 of FIG. 2) may analyze two builds and/or two or more code files, to determine and produce the changes between the two builds and/or files. According to an aspect of the invention, the builds and/or files are analyzed in terms of software modules that are changed between builds. As used herein, a build (i.e., software build) is a process of converting a source code file into a standalone software artifact that can be run on a computer or is the result of doing so. Therefore, test-case optimization module 225 is configured to select at least one software module (e.g., a build, file, etc.) that has been modified as compared to a previous version of the software module.

In embodiments, test-case optimization module 225 is further configured to isolate and/or remove test cases and corresponding CDAGs associated with each of the selected software modules. As explained above, a CDAG is more robust than a DAG because the CDAG is produced after reconciling and/or consolidating a DAG with an associated DM. In other words, the CDAG comprises code dependencies parsed from code comments and product documentation and from sequence of modules directly or indirectly impacted by a test case. A DAG comprises sequence(s) of modules directly or indirectly impacted by a test case.

In embodiments, test-case optimization module 225 is further configured to determine a set of CDM nodes by identifying overlapping portions of the consolidated CDAGs. That is, the CDAGs that were isolated and/or removed, as described above, are further analyzed to determine whether there is an opportunity to consolidate a set of CDM nodes. In this manner, test-case optimization module 225 may determine an optimized list of test cases to ensure code coverage for regression testing in a continuous integration environment without manual interference. As used herein, an optimized list of test cases refers to a list of test cases that is able to ensure complete code coverage for each of the modified software modules. The list may be optimized in terms of fewest number of tests to run, least amount of processing for the prescribed tests, least amount of time to complete the tests, and/or based on any other characteristic that may be optimized while ensuring the complete coverage described herein.

In an embodiment, test-case optimization module 225 may be further configured to optimize the stored DAG by merging the view of all common nodes of different DAGs of other test cases into a single node. This optimizing/merging action would list sets of test cases that are common for the same path. This action may also identify test cases that have different paths resulting in complete coverage.

In accordance with aspects of the invention, test-case execution module 230 is configured to determine whether a CDM node is marked as verified or unverified and run the test cases that have not already been evaluated and/or call CDM nodes that are not already marked as verified. As used herein, whether a CDM node is marked as verified refers to whether the node has already been tested and verified to create no issues in the modified build.

In embodiments, test-case execution module 225 is configured to determine whether a CDM node is marked as verified or unverified. By identifying whether any CDM nodes are marked as verified or unverified, test-case execution module 225 may further reduce the number of test cases needed for complete-coverage regression testing. In embodiments, test-case execution module 225 is configured to run the test cases identified by test-case optimization module 225 above, to verify each CDM node called within each software module. In embodiments where some software modules are already completely verified, the test cases may be run to verify the remaining CDM nodes within any non-verified software modules.

FIG. 3 shows a flowchart of an exemplary method 300 in accordance with aspects of the present invention. Steps of the method may be carried out in the environment of FIG. 2 and are described with reference to elements depicted in FIG. 2.

At block 305, regression-test optimization server 210 of FIG. 2 optionally receives, or otherwise accesses, a plurality of software modules to be analyzed. In embodiments, regression-test optimization server 210 receives the software module to be analyzed from data sources 235 or user device 240 via network 250. In another embodiment, regression-test optimization server 210 accesses the software module to be analyzed at data sources 235 or user device 240 over network 250. In an embodiment, at least one software module to be analyzed is stored at the regression-test optimization server 210.

At block 310, test-case optimization module 225 of FIG. 2 selects at least one software module that contains modified and/or changed code. That is, test-case optimization module 225 selects code that has been modified, updated, or experienced any change that might be tested to ensure that no bugs or unintended breaks in the code have been introduced. For example, as explained above, a processing system (such as regression-test optimization server 210 of FIG. 2) may analyze two builds and/or two or more code files, to determine and produce the changes between the two builds and/or files. According to an aspect of the invention, the builds and/or files are analyzed in terms of software modules that are changed between builds. Therefore, test-case optimization module 225 is configured to select at least one software module (e.g., a build, file, etc.) that has been modified as compared to a previous version of the software module.

At block 315, test-case optimization module 225 of FIG. 2 isolates and/or removes test cases and corresponding CDAGs associated with each of the selected software modules. For example, as explained above, this may include exercising, or exploiting, a particular program path or verifying a particular path's compliance with a specific requirement.

At block 320, test-case optimization module 225 of FIG. 2 determines an optimized list of test cases by identifying overlapping portions of CDAGs and a set of consolidated dependency matrix (CDM) nodes. That is, the CDAGs that are isolated and/or removed at block 315 are further analyzed to determine whether there is an opportunity to consolidate a set of CDM nodes. By consolidating a set of CDM nodes, test-case optimization module 225 may determine an optimized list of test cases to ensure code coverage for regression testing in a continuous integration environment without manual interference.

In an embodiment, test-case optimization module 225 may further optimize the stored DAG by merging the view of all common nodes of different DAGs of other test cases into a single node. This optimizing/merging action would list sets of test cases that are common for the same path. This action may also identify test cases that have different paths resulting in complete coverage.

At block 325, test-case execution module 225 of FIG. 2 optionally determines whether a CDM node is marked as (un) verified. As explained above, whether a CDM node is marked as verified refers to whether the node has already been tested and verified to create no issues in the modified build. By identifying whether any CDM nodes are marked as (un) verified, test-case execution module 225 may further reduce the number of test cases needed for complete-coverage testing.

At block 330, test-case execution module 230 of FIG. 2 performs (i.e., runs) the test cases identified in block 320 above that are associated with a CDM that is not already marked as verified, to verify them. In embodiments where some software modules are already completely verified (e.g., as may be optionally performed at block 325), the test cases may be run to verify any remaining portions of the unverified software modules. In embodiments, test-case execution module 230 performs (i.e., runs) each test case of the optimized list of test cases associated with any unverified CDM nodes until each CDM node is verified.

At block 335, regression-test optimization server 210 of FIG. 2 may optionally transmit an optimized list of test cases (e.g., as determined at block 320) and/or an indication that each of the CDM nodes have been tested and verified. In such embodiments, the optimized list and/or indication are transmitted to data sources 235 and/or user device 240 via network 250. In embodiments, the optimized list and/or indication may also, or alternatively, be stored locally at regression-test optimization server 210.

Figure 4:
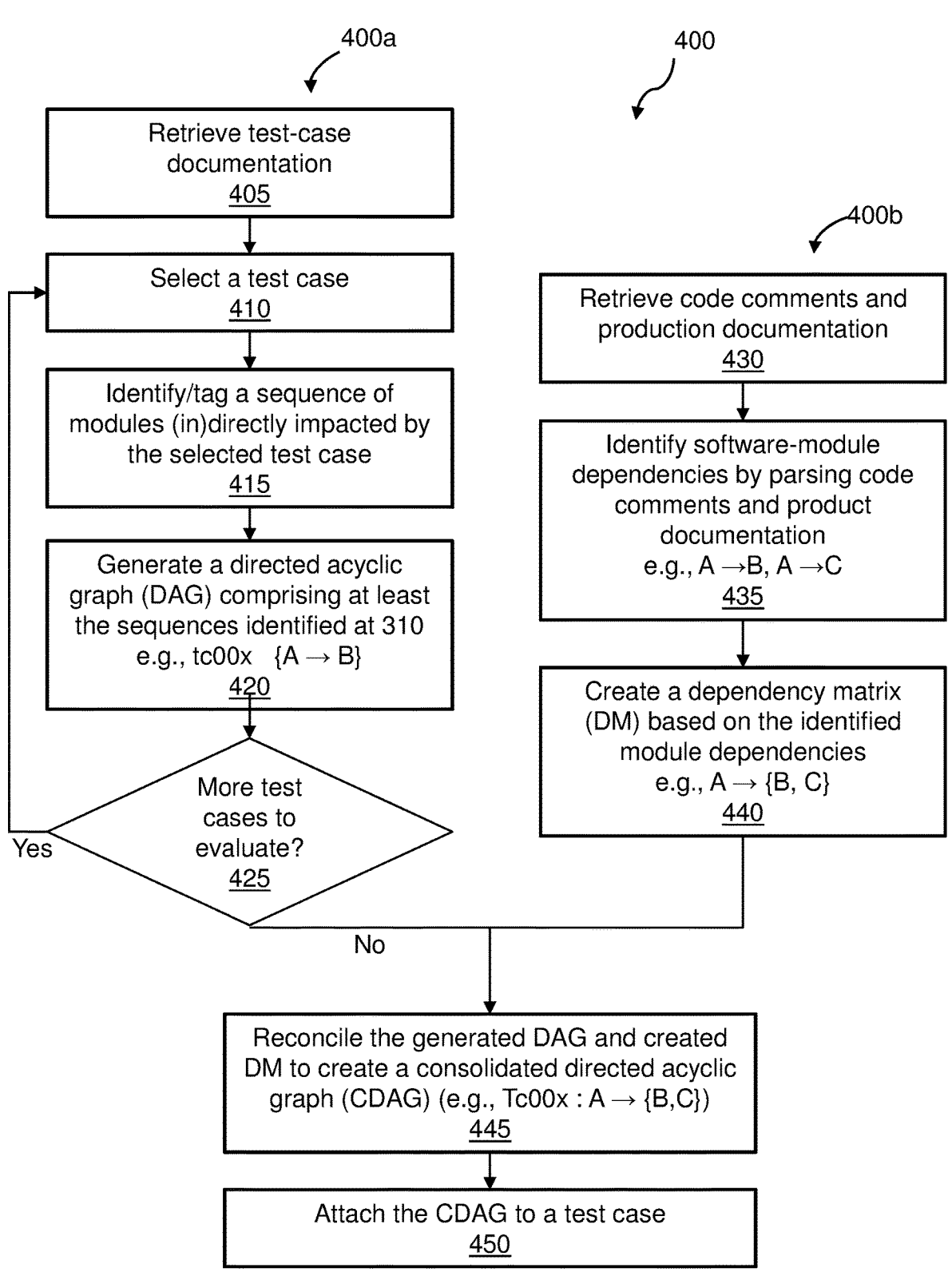
FIG. 4 shows a flowchart of an exemplary method in accordance with aspects of the present invention.

FIG. 4 shows a flowchart of an exemplary method in accordance with aspects of the present invention. Steps of the method may be carried out in the environment of FIG. 2 and are described with reference to elements depicted in FIG. 2. Specifically, FIG. 4 illustrates process 400 which comprises two sub-processes, DAG creation sub-process 400a and DM creation sub-process 400b. Process 400 may be used to create the CDAG described above with respect to FIG. 3.

DAG creation sub-process 400a begins at block 405 where DAG module 215 of FIG. 2 retrieves test-case documentation for one or more test cases. In embodiments, the test-case documentation may include a summary of the scope of each retrieved test, test objectives, the system functionalities based on the test scenarios and requirements, hardware and software configurations required to run the test.

At block 410, DAG module 215 of FIG. 2 selects one of the test cases of the one or more test cases based on the test-case documentation, the objectives of the test, and the system functionalities. At block 415, DAG module 215 identifies and/or tags a sequence of modules that are directly and/or indirectly impacted by the selected test. In embodiments, this may include determining dependencies of the various modules tested by the test case.

At block 420, DAG module 215 of FIG. 2 generates a DAG comprising at least the sequence(s) of modules identified at block 310. As explained above, a DAG shows a trace/profile/critical path taken by the test cases as the software module is tested. The created DAG represents a structure of software modules or blocks and may be helpful to visualize the flow of values between basic software modules or blocks. For example, in block 420, tc00x represents the structure of a DAG showing the flow of values from module A to module B (i.e., A→B). In an embodiment, the generated DAG may be attached to an associated test case. In other words, the test case carries with it the accompanying DAG, showing the sequence(s) identified at block 310.

At block 425, DAG module 215 of FIG. 2 determines whether additional tests should be evaluated. If there are more tests to evaluate, DAG module 215 returns to block 410 to select the next test case and proceeds to blocks 415 and 420 until each test case has been evaluated. When there are no more test cases DAG module 215 proceeds to block 445, where DAG creation sub-process 400a and DM creation sub-process 400b meet.

DM creation sub-process 400b begins at block 430. At block 430, dependency matrix module 220 of FIG. 2 retrieves code comments and production documentation associated with one or more software modules, directly from the one or more software modules. As explained above, when software code is written and/or created, developers often include human-readable comments describing the goals, strategy, logic, actions, and other details about functionality of the code. Proper use of commenting can make code maintenance easier and helps others understand the functions the code should perform. The code comments may further include descriptions about module dependencies. Additionally, the product documentation may include descriptions about module dependencies. As explained above, product documentation may include external documentation such as user manuals, technical specifications, design documents, and internal documents like coding guidelines, standards, and conventions. Product documentation generally provides information about a codebase to developers working on the project, helping them understand and improve it. The product documentation also guides users and other technical professionals who may need to work with the code in the future.

At block 435, dependency matrix module 220 of FIG. 2 identifies potential software module dependencies by parsing the retrieved code comments and product documentation. In embodiments, the parsing is performed to determine a DM of modules that is exhaustive. As explained above, a DM is a graph that tracks/shows dependencies between parts of a software build (e.g., modules, classes, files, etc.) and highlights an information flow. The DM shows how/which modules might be affected by the modified code or when the code, associated with a related module, is modified. For example, parsing the retrieved code comments and product documentation might show that module A depends on module B (i.e., A→B) and that module A also depends on module C (i.e., A→C) based on a developers comment in the code.

At block 440, dependency matrix module 220 of FIG. 2 creates a DM based on the module dependencies identified at block 435. For example, the DM may show that module A depends on both modules B and C (i.e., A→{B,C}).

At block 445, the product of DAG creation sub-process 400a (i.e., test cases having an associated DAG) and the product of DM creation sub-process 400b (i.e., a DM) are consolidated by regression-test optimization server 210. That is, regression-test optimization server 210 of FIG. 2 reconciles the DAG and DM to create a CDAG. For example, in block 445, Tc00x represents the reconciled/consolidated CDAG structure showing the flow of values from module A to modules B and C (i.e., A→{B,C}). This reconciliation/consolidation of the DAG and DM is conducted to find the most optimal tests to be conducted to save the most time, most effort, most energy, or another metric that may be used to determine an optimal test. The addition of the DM created based on the parsed code comments and product documentation uncovers an additional layer of information that improves the overall ability to find the optimal tests.

At block 450, regression-test optimization server 210 may further attach the CDAG to an associated test case. In other words, the test case carries with it the associated/accompanying CDAG, showing the consolidated dependencies of the DAGs and DMs when performing specific test cases. This process is repeated/completed for each test case that is selected at block 410. Furthermore, the resulting test cases, carrying the associated or accompanying CDAG may be used at one or both of blocks 315 and 320 of FIG. 3.

Figure 5:
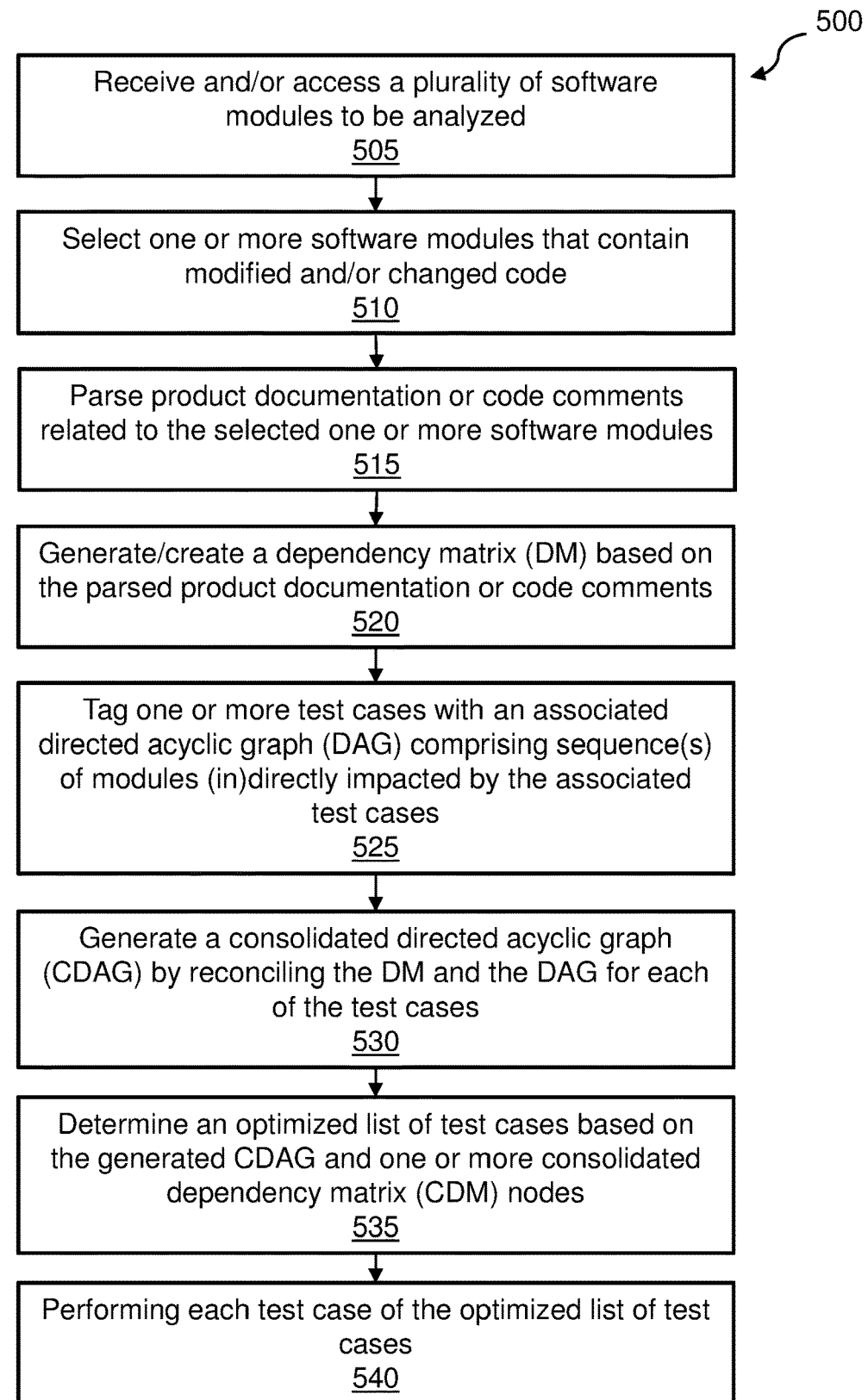
FIG. 5 shows a flowchart of an exemplary in accordance with aspects of the present invention.

FIG. 5 shows a flowchart of an exemplary method 500 in accordance with aspects of the present invention. Steps of method 500 may be carried out in the environment of FIG. 2 and may be performed using techniques described in FIGS. 3 and 4.

At block 505, regression-test optimization server 210 of FIG. 2 receives, or otherwise accesses, a plurality of software modules to be analyzed as explained above with respect to FIG. 3. In embodiments, regression-test optimization server 210 receives the software module to be analyzed from data sources 235 or user device 240 via network 250. In another embodiment, regression-test optimization server 210 accesses the software module to be analyzed at data sources 235 or user device 240 over network 250. In an embodiment, at least one software module to be analyzed is stored at the regression-test optimization server 210.

At block 510, test-case optimization module 225 of FIG. 2 selects at least one software module that contains modified and/or changed code, as explained above with respect to FIG. 3. That is, test-case optimization module 225 selects code that has been modified, updated, or experienced any change that might be tested to ensure that no bugs or unintended breaks in the code have been introduced. For example, as explained above, a processing system (such as regression-test optimization server 210 of FIG. 2) may analyze two builds and/or two or more code files, to determine and produce the changes between the two builds and/or files. According to an aspect of the invention, the builds and/or files are analyzed in terms of software modules that are changed between builds. Therefore, test-case optimization module 225 is configured to select at least one software module (e.g., a build, file, etc.) that has been modified as compared to a previous version of the software module.

At block 515, dependency matrix module 220 of FIG. 2 parses product documentation or code comments related to one or more software modules selected at block 510. As explained above with respect to FIG. 4, in embodiments, dependency matrix module 220 of FIG. 2 retrieves code comments and production documentation associated with one or more software modules, directly from the one or more software modules. In embodiments, dependency matrix module 220 of FIG. 2 identifies potential software module dependencies by the parsing at block 515.

At block 520, dependency matrix module 220 of FIG. 2 generates and/or creates a DM based on the module dependencies identified at block 515. That is, the parsing at block 515 is performed to determine a DM of modules that show or tracks dependencies between parts of a software build (e.g., modules, classes, files, etc.) and highlights an information flow. The DM generation and/or creation at block 520 shows how/which modules might be affected by the modified code.

At block 525, DAG module 215 of FIG. 2 tags one or more test cases with an associated DAG comprising sequence(s) of modules that are directly or indirectly impacted by the associated test cases. In other words, DAG module 215 identifies sequence(s) of modules that are directly and/or indirectly impacted by the test cases and tags the test cases with the associated DAG. In embodiments, the tagging of block 525 may be performed using the methods described with respect to FIG. 4 above.

At block 530, regression-test optimization server 210 of FIG. 2 generates a CDAG by reconciling the DM and the DAG for each of the test cases tagged at block 525. In other words, regression-test optimization server 210 reconciles the DAG and DM to create a CDAG. As explained above with respect to FIG. 4, this reconciliation/consolidation of the DAG and DM is conducted to find the most optimal tests to be conducted to save the most time, most effort, most energy, or another metric that may be used to determine an optimal test. The addition of the DM created based on the parsed code comments and product documentation uncovers an additional layer of information that improves the overall ability to find the optimal tests.

At block 535, test-case optimization module 225 of FIG. 2 determines an optimized list of test cases based on the CDAG generated at block 530. In other words, test-case optimization module 225 determines an optimized list of test cases using a CDM showing the nodes affected by each test case. By identifying overlapping potions of the CDAG and the overlapping nodes within the CDM, test-case optimization module 225 may determine an optimized list of test cases to ensure code coverage for regressions in a continuous integration environment without manual interference. That is, optimization module 225 may determine a minimum number of test cases to run to ensure complete code coverage. The list may be optimized in terms of fewest number of tests to run, least amount of processing for the prescribed tests, least amount of time to complete the tests, and/or based on any other characteristic that may be optimized while ensuring the complete coverage described herein.

At block 540, test-case execution module 230 of FIG. 2 performs (i.e., runs) each test case of the optimized list of test cases determined at block 535. In embodiments where some software modules are already verified, the test cases may be run to verify the remaining non-verified software modules. In embodiments, test-case execution module 230 performs (i.e., runs) each test case of the optimized list of test cases until every node of the CDM is verified.

In additional embodiments, the invention provides a computer-implemented method, via a network. In this case, a computer infrastructure, such as computer 101 of FIG. 1, can be provided and one or more systems for performing the processes of the invention can be obtained (e.g., created, purchased, used, modified, etc.) and deployed to the computer infrastructure. To this extent, the deployment of a system may comprise one or more of: (1) installing program code on a computing device, such as computer 101 of FIG. 1, from a computer readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:

receiving, by a processor set, from data sources, a plurality of software modules to be analyzed in a continuous integration environment;

selecting, by the processor set, one or more software modules of the plurality of software modules that contain modified code;

parsing, by the processor set, product documentation or code comments related to the selected one or more software modules;

generating, by the processor set, a dependency matrix (DM) by executing a DM creation sub-process of a process based on the parsed product documentation or the parsed code comments that show dependencies between parts of the selected one or more software modules and information flow therethrough;

generating an associated directed acyclic graph (DAG) by executing a DAG creation sub-process of the process based on retrieving test-case documentation, and tagging, by the processor set, one or more test cases with the associated directed acyclic graph (DAG) comprising a sequence of modules of the plurality of software modules directly or indirectly impacted by the one or more test cases;

generating, by executing the process by the processor set, a consolidated directed acyclic graph (CDAG) by reconciling the DM and the associated DAG for each of the one or more test cases;

determining, by the processor set, an optimized list of test cases based on identifying overlapping portions of the generated CDAG and one or more consolidated dependency matrix (CDM) nodes that overlap, wherein the optimized list of test cases ensures regression testing of complete code of the selected one or more software modules; and executing, by the processor set, the regression testing on the selected one or more software modules based on each test case of the optimized list of test cases to verify each CDM node called within each software module, wherein the execution of the regression testing based on each test case of the optimized list of test cases is performed in the continuous integration environment without manual interference and includes executing, by the processor set in the continuous integration environment, test cases associated with CDM nodes marked as unverified, while skipping execution of test cases associated with CDM nodes marked as verified.

2. The computer-implemented method of claim 1, wherein the parsing comprises parsing both the product documentation and the code comments related to the selected one or more software modules.

3. The computer-implemented method of claim 1, further comprising retrieving the product documentation or the code comments directly from the plurality of software modules.

4. The computer-implemented method of claim 1, further comprising determining, by the processor set, whether a CDM node of the one or more CDM nodes is marked as verified or unverified.

5. The computer-implemented method of claim 1, wherein the executing the regression testing comprises performing each test case of the optimized list of test cases until each CDM node of the one or more CDM nodes is verified.

6. The computer-implemented method of claim 1, further comprising transmitting, by the processor set, the optimized list of test cases to a user device or to a data source.

7. The computer-implemented method of claim 1, further comprising transmitting, by the processor set, an indication that each CDM node of the one or more CDM nodes is verified.

8. A computer program product comprising one or more computer readable storage media having program instructions collectively stored on the one or more computer readable storage media, the program instructions configured to:

receive, from data sources, a plurality of software modules to be analyzed in a continuous integration environment;

select one or more software modules of the plurality of software modules that contain modified code;

parse product documentation or code comments related to the selected one or more software modules;

generate a dependency matrix (DM) by executing a DM creation sub-process of a process based on the parsed product documentation or the parsed code comments that show dependencies between parts of the selected one or more software modules and information flow therethrough;

generate an associated directed acyclic graph (DAG) by executing a DAG creation sub-process of the process based on retrieving test-case documentation, and tag one or more test cases with the associated directed acyclic graph (DAG) comprising a sequence of modules of the plurality of software modules directly or indirectly impacted by the one or more test cases;

generate by executing the process a consolidated directed acyclic graph (CDAG) by reconciling the DM and the associated DAG for each of the one or more test cases;

determine an optimized list of test cases based on identifying overlapping portions of the generated CDAG and one or more consolidated dependency matrix (CDM) nodes that overlap, wherein the optimized list of test cases ensures regression testing of complete code of the selected one or more software modules; and execute the regression testing on the selected one or more software modules based on each test case of the optimized list of test cases to verify each CDM node called within each software module, wherein the execution of the regression testing based on each test case of the optimized list of test cases is performed in the continuous integration environment without manual interference and includes executing, in the continuous integration environment, test cases associated with CDM nodes marked as unverified, while skipping execution of test cases associated with CDM nodes marked as verified.

9. The computer program product of claim 8, wherein the parsing comprises parsing both the product documentation and the code comments related to the selected one or more software modules.

10. The computer program product of claim 8, wherein the program instructions are further executable to retrieve the product documentation or the code comments directly from the plurality of software modules.

11. The computer program product of claim 8, wherein the program instructions are further executable to determine whether a CDM node of the one or more CDM nodes is marked as verified or unverified.

12. The computer program product of claim 8, wherein the executing the regression testing comprises performing each test case of the optimized list of test cases until each CDM node of the one or more CDM nodes is verified.

13. The computer program product of claim 8, wherein the program instructions are further executable to transmit the optimized list of test cases to a user device or to a data source or to transmit an indication that each CDM node of the one or more CDM nodes is verified.

14. A system comprising:

a processor set, one or more computer readable storage media, and program instructions collectively stored on the one or more computer readable storage media, the program instructions configured to:

receive, from data sources, a plurality of software modules to be analyzed in a continuous integration environment;

select one or more software modules of the plurality of software modules that contain modified code;

parse product documentation or code comments related to the selected one or more software modules;

generate a dependency matrix (DM) by executing a DM creation sub-process of a process based on the parsed product documentation or the parsed code comments that show dependencies between parts of the selected one or more software modules and information flow therethrough;

generate an associated directed acyclic graph (DAG) by executing a DAG creation sub-process of the process based on retrieving test-case documentation, and tag one or more test cases with the associated directed acyclic graph (DAG) comprising a sequence of modules of the plurality of software modules directly or indirectly impacted by the one or more test cases;

generate, by executing the process, a consolidated directed acyclic graph (CDAG) by reconciling the DM and the associated DAG for each of the one or more test cases;

determine an optimized list of test cases based on identifying overlapping portions of the generated CDAG and one or more consolidated dependency matrix (CDM) nodes that overlap, wherein the optimized list of test cases ensures regression testing of complete code of the selected one or more software modules; and execute the regression testing on the selected one or more software modules based on each test case of the optimized list of test cases to verify each CDM node called within each software module, wherein the execution of the regression testing based on each test case of the optimized list of test cases is performed in the continuous integration environment without manual interference and includes executing, in the continuous integration environment, test cases associated with CDM nodes marked as unverified, while skipping execution of test cases associated with CDM nodes marked as verified.

15. The system of claim 14, wherein the parsing comprises parsing both the product documentation and the code comments related to the selected one or more software modules.

16. The system of claim 14, wherein the program instructions are further executable to retrieve the product documentation and the code comments directly from the plurality of software modules.

17. The system of claim 14, wherein the program instructions are further executable to determine whether a CDM node of the one or more CDM nodes is marked as verified or unverified.

18. The system of claim 14, wherein the executing the regression testing comprises performing each test case of the optimized list of test cases until each CDM node of the one or more CDM nodes is verified.

* * * * *